United States Patent
Ge et al.

(10) Patent No.: US 8,693,565 B2
(45) Date of Patent: Apr. 8, 2014

(54) METHOD AND DEVICE FOR TRANSMITTING AND RECEIVING SIGNAL IN WIRELESS COMMUNICATION SYSTEM

(75) Inventors: Ning Ge, Beijing (CN); Liang Zhu, Beijing (CN); Yukui Pei, Beijing (CN)

(73) Assignees: Sony Corporation, Tokyo (JP); Tsinghua University, Beijing (CN)

( * ) Notice: Subject to any disclaimer, the term of this patent is extended or adjusted under 35 U.S.C. 154(b) by 319 days.

(21) Appl. No.: 13/223,620

(22) Filed: Sep. 1, 2011

(65) Prior Publication Data

US 2012/0057625 A1 Mar. 8, 2012

(30) Foreign Application Priority Data

Sep. 2, 2010 (CN) .......................... 2010 1 0273310

(51) Int. Cl.
*H04B 7/02* (2006.01)

(52) U.S. Cl.
USPC .............. 375/267; 375/299; 375/347

(58) Field of Classification Search
USPC .......................................... 375/267, 299, 347
See application file for complete search history.

(56) References Cited

U.S. PATENT DOCUMENTS

| | | | |
|---|---|---|---|
| 2010/0111145 A1* | 5/2010 | Trachewsky et al. | 375/220 |
| 2010/0124266 A1* | 5/2010 | Cho et al. | 375/232 |
| 2011/0200058 A1* | 8/2011 | Mushkin et al. | 370/475 |

* cited by examiner

*Primary Examiner* — Kevin Kim
(74) *Attorney, Agent, or Firm* — Oblon, Spivak, McClelland, Maier & Neustadt, L.L.P.

(57) ABSTRACT

A method and device for transmitting and receiving a signal in a wireless communication system. The method for transmitting a signal in a wireless communication system includes: receiving an original data block to be transmitted, the length of the original data block being M, wherein M is an integer; disordering the original data block for one or more times, whereby M data symbols in the original data block are rearranged in each of the one or more times of the disordering, so as to obtain one or more disordered data blocks with length of M; cascading the original data block and the one or more disordered data blocks with a cyclic prefix, to form an equalized signal of frequency domain diversity with time-frequency interleaving; and transmitting the equalized signal of frequency domain diversity through a single carrier.

12 Claims, 4 Drawing Sheets

METHOD AND DEVICE FOR TRANSMITTING AND RECEIVING SIGNAL IN WIRELESS COMMUNICATION SYSTEM

FIELD OF THE INVENTION

The present invention relates to the field of wireless communication technology, and in particular, to a method and device for transmitting and receiving a signal in a wireless communication system.

BACKGROUND OF THE INVENTION

Equalization technology is commonly classified into two classes: linear equalization and nonlinear equalization. A linear equalizer is relatively simple, and can eliminate the effect of a channel effectively when a channel fading is not serious. A Zero Forcing (ZF) algorithm and a Minimum Mean Square Error (MMSE) algorithm are commonly used algorithms. When the multipath fading of a wireless channel is serious, a very deep zero point occurs in the frequency domain response of the channel. In order to compensate the amplitude fading near the zero point, the linear equalizer has to amplify the frequency spectrum of a corresponding frequency band. Thus, the noise of the corresponding frequency band is enhanced (especially for a ZF equalizer), and the Signal Noise Ratio of the system is reduced. Meanwhile, a nonlinear equalizer will have a better effect in such severe channel. A Decision Feedback Equalizer (DFE) is one of commonly used nonlinear equalizers.

Multi-carrier Orthogonal Frequency Division Multiplexing (OFDM) is a modulating manner for a frequency selective channel. K subcarriers with equal interval are employed, each subcarrier is modulated individually, and the symbol period is K times of that of a single-carrier system having a same rate. Multipath interference can be suppressed effectively. Moreover, the OFDM system inserts a guard space among respective symbols so as to eliminate inter-symbol interference. Fast Fourier Transform (FFT) and Inverse Fast Fourier Transform (IFFT) can be used to achieve modulating and demodulating of an OFDM signal. Since a part of sub channels will also encounter deep fading and result in a high code error rate, which will result in a code error platform for the OFDM system, a strong error correction coding is commonly employed to correct the error. However, a long channel error correction coding will result in a long time delay of processing of the system. Therefore, a diversity of frequency domain is employed to improve the channel. That is, same information symbols are transmitted over different subcarriers. Diversity gain can be obtained when fading of respective subcarriers is independent, thereby avoiding the high code error rate of data over the subcarriers due to the deep fading.

A linear equalizer using a non-ZF algorithm such as a MMSE equalizer may reduce the amplification of the noise for the zero point in the frequency domain. However, a problem occurs that the equalizer remains the inter-symbol interference. The remained inter-symbol interference would significantly reduce the performance of the modulating system, resulting in the platform of the code error rate. The nonlinear equalizer DFE has a relatively high complexity of processing when the data rate is high. A problem regarding stability and decision code error propagation also occurs. Accordingly, both the linear and nonlinear equalizers have some defects. Especially, when a channel is severe, the time delay of the channel is long, resulting in a large inter-symbol interference and more zero points in the frequency domain. In such case, both the MMSE and DFE equalizers have bad performance.

Diversity technology of OFDM can improve the channel response, which is different from the channel equalization. Both the linear and nonlinear equalization is to accommodate severe channel conditions. However, a severe inter-symbol interference of the channel has occurred at this time, it is too late to make correction only using an equalizer. On the other hand, the OFDM has a complicated hardware structure and high energy consumption. As a signal is divided into a plurality of subcarrier signals, a problem occurs that the amplitudes of the subcarrier signals superimpose when symbols of all subcarrier signals are same, which is referred to as a Peak to Average Power Ratio (PAPR) problem. The PAPR problem causes the energy consumption for transmission to increase several dBs, and results in high requirement for Automatic Gain Control (AGC) and linearity of a high frequency component of a circuit. Therefore, the complexity, energy consumption, and cost of the OFDM are all high.

SUMMARY OF THE INVENTION

Hereinafter, there is provided a brief summary about the present invention in order to provide a basic understanding on certain aspects of the invention. However, it should be understood that this summary is not an exhaustive summary about the invention. It is not intended to determine critical portions or important portions of the invention, nor does it intend to limit the scope of the invention. The object thereof is only to propose some concepts with respect to the invention in a simplified form, thereby to be a prelude of the more detailed description given later.

The present invention provides a Time-Frequency Interleaving, Frequency domain Diversity, and Linear Equalization (TFI-FD-LE) processing technology. By rearranging the order of data of an original data block at a transmitting terminal, and performing maximum ratio combining in time domain at a receiving terminal, the same subcarrier frequency domain diversity gain as that of an OFDM frequency division system can be obtained, significantly improving the situation of deep fading of a channel when the channel has a long time delay.

The frequency domain diversity gain of the TFI-FD-LE technology according to the present invention requires that the coherent bandwidth of the channel is much smaller than the transmission band of the communication system. Generally, a Root Mean Square (RMS) time delay indoors is 50 ns, corresponding to a coherent bandwidth of 3 MHz, a RMS time delay outdoors is 30 µs, corresponding to a coherent bandwidth of 5 KHz. Many channels such as an ultra wideband indoor channel occupy a bandwidth of 500 MHz. Moreover, the Long Term Evolution (LTE) of the outdoor wireless cellular 3rd Generation Partnership Project (3GPP) has a bandwidth up to 20 MHz. Such bandwidths are much higher than corresponding coherent bandwidths. Therefore, the range for applying the present invention is wide.

The TFI-FD-LE technology according to the present invention achieves the time-frequency interleaving by means of diversity characteristic inherent in the frequency selective channel. Accordingly, the TFI-FD-LE technology according to the present invention does not require to employ an additional Radio Frequency (RF) front end, a multi-antenna, and relay operation among individual terminals required for multi-antenna diversity as in the prior art. Thus, the energy consumption and the size of the terminal in the TFI-FD-LE technology according to the present invention can be reduced.

According to an aspect of the invention, there is provided a method for transmitting a signal in a wireless communication system including the steps of: receiving an original data block to be transmitted, the length of the original data block being M, wherein M is an integer; disordering the original data block for one or more times, whereby M data symbols in the original data block are rearranged in each of the one or more times of the disordering, so as to obtain one or more disordered data blocks with length of M; cascading the original data block and the one or more disordered data blocks with a cyclic prefix, to form an equalized signal of frequency domain diversity with time-frequency interleaving; and transmitting the equalized signal of frequency domain diversity through a single carrier.

According to another aspect of the invention, there is further provided a method for receiving a signal in a wireless communication system including the steps of: obtaining an equalized signal of frequency domain diversity with time-frequency interleaving, the equalized signal of frequency domain diversity including an original data block and one or more disordered data blocks cascaded with a cyclic prefix; removing the cyclic prefix to obtain the original data block and the one or more disordered data blocks; and performing signal combining in time domain on the original data block and the one or more disordered data blocks, to obtain a combined signal of frequency domain diversity.

According to another aspect of the invention, there is further provided a device for transmitting a signal in a wireless communication system including: an original data block receiving unit configured to receive an original data block to be transmitted, the length of the original data block being M, wherein M is an integer; a disordering unit configured to disorder the original data block received by the original data block receiving unit for one or more times, whereby M data symbols in the original data block are rearranged in each of the one or more times of the disordering, so as to obtain one or more disordered data blocks with length of M; a cascading unit configured to cascade the original data block received by the original data block receiving unit and the one or more disordered data blocks disordered by the disordering unit with a cyclic prefix, to form an equalized signal of frequency domain diversity with time-frequency interleaving; and a transmitting unit configured to transmit the equalized signal of frequency domain diversity formed by the cascading unit through a single carrier.

According to another aspect of the invention, there is further provided a device for receiving a signal in a wireless communication system including: an equalized signal of frequency domain diversity obtaining unit configured to obtain an equalized signal of frequency domain diversity with time-frequency interleaving, the equalized signal of frequency domain diversity including an original data block and one or more disordered data blocks cascaded with a cyclic prefix; a cyclic prefix removing unit configured to remove the cyclic prefix to obtain the original data block and the one or more disordered data blocks; and a combining unit configured to perform signal combining in time domain on the original data block and the one or more disordered data blocks obtained by the cyclic prefix removing unit, to obtain a combined signal of frequency domain diversity.

In contrast with the subcarrier frequency domain diversity of OFDM, the TFI-FD-LE technology according to the present invention has not the PAPR problem. The single carrier modulation in the TFI-FD-LE technology according to the present invention greatly reduces the requirement for linearity of a RF device as in the OFDM. The cost for apparatus and complexity of hardware are reduced. In contrast with the OFDM, energy consumption in the RF component of the wireless communication (without power rollback of several dBs) is significantly reduced. The present invention is especially applicable for an ultra wideband wireless handheld device powered by a battery. Therefore, the application scope of the present invention is wide.

The TFI-FD-LE technology according to the present invention performs time domain interleaving, and performs maximum ratio combining frequency-domain sub channel at the receiving terminal. In the case of broadband wireless communication transmission with deep fading, the channel is greatly improved, and the performance of the linear equalizer at the receiving terminal is improved. And, since the diversity of the TFI-FD-LE need not a multiple RF front-end circuit as in the multi-antenna diversity, the energy consumption and the size of the terminal in the TFI-FD-LE technology according to the present invention can be reduced.

According to the technical solution of the present invention, there is no problem regarding complexity and stability of a nonlinear time domain equalizer. The linear equalization is a Finite Impulse Response (FIR) system, and therefore the TFI-FD-LE technology according to the present invention is stable and reliable.

BRIEF DESCRIPTION OF THE DRAWINGS

The invention can be better understood by referring to the detailed description given hereinafter in combination with the accompany drawings in which identical or similar components are denoted by identical or similar reference numbers. The accompany drawings together with the detailed description below are included in the specification and form parts of the specification for further illustrating preferred embodiments of the invention and explaining principles and advantages of the invention by way of example. Wherein.

Figure 1:
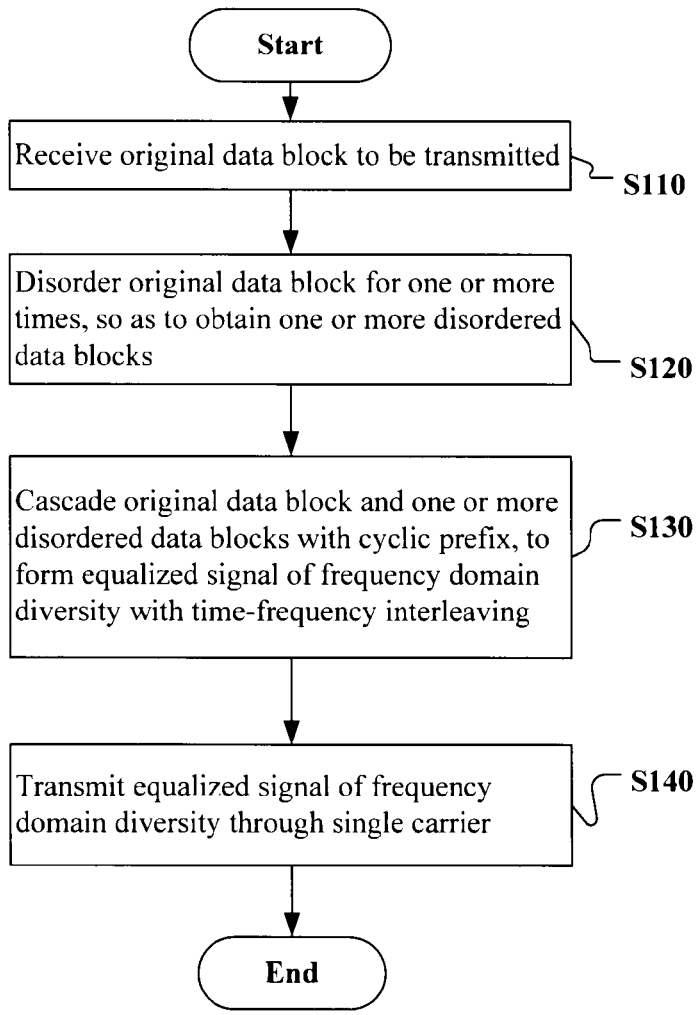
FIG. 1 is a flow chart illustrating a method for transmitting a signal in a wireless communication system according to an embodiment of the invention.

Those skilled in the art should understand that elements in the drawings are only shown for the purpose of simplicity and clarity, and are not necessarily drawn to scales. For example, sizes of certain elements in the drawings may be enlarged relative to other elements so that it is helpful to improve the understanding on the embodiments of the invention.

DETAILED DESCRIPTION OF THE INVENTION

Hereinafter, an exemplary embodiment of the invention will be described in combination with the drawings. For the purpose of clarity and simplicity, not all the features of the actual embodiment are described in the specification. However, it should be appreciated that it has to make a lot of decisions specific to the embodiments during a process for developing any such actual embodiments in order to achieve specific targets of developers, for example, complying with those restrictive conditions related to systems and operations, and these restrictive conditions may vary with different embodiments. Further, it should also be appreciated that although developing work may be very complex and time-consuming, such developing work is merely a routine task for those skilled in the art who benefit from the present disclosure.

Herein, there is still one point needed to be illustrated that, for preventing unnecessary details from obscuring the invention, only the device structures and/or processing steps closely related to the scheme according to the invention are shown in the drawings, and other details having little to do with the invention are omitted.

The method for transmitting a signal in a wireless communication system according to the embodiment of the invention is described in detail with reference to the drawings in the following.

FIG. 1 is a flow chart illustrating a method for transmitting a signal in a wireless communication system according to an embodiment of the invention.

Firstly, in step S110, an original data block to be transmitted is received.

Herein, it is assumed that the length of the original data block is M, wherein M is an integer.

Next, in step S120, the original data block is disordered for one or more times, so as to obtain one or more disordered data blocks.

According the present invention, M data symbols in the original data block are rearranged in each of the one or more times of the disordering. The length of each of the obtained one or more disordered data blocks is M.

Next, in step S130, the original data block and the one or more disordered data blocks are cascaded with a cyclic prefix, to form an equalized signal of frequency domain diversity with time-frequency interleaving.

Finally, in step S140, the equalized signal of frequency domain diversity is transmitted through a single carrier.

According to the present invention, the TFI-FD-LE technology performs data rearrangement and transmission on the data block with Single Carrier-Frequency domain Diversity Equalization (SC-FDE) at the transmitting terminal. Each time one data block with data rearranged is retransmitted, it equivalents, on the frequency domain, to adding one diversity branch, i.e., one antenna branch in a multi-antenna system or one subcarrier in an OFDM frequency division system. If fading among equivalent sub channels disordered randomly is independent, the diversity gain in Maximum Ratio Combining (MRC) is maximal.

According to the preferred embodiment of the present invention, the equalized signal of frequency domain diversity is transmitted over a quasi-static channel through the single carrier.

According to the preferred embodiment of the present invention, the times of the disordering of the original data block is determined based on the requirement to the lowest transmission rate in the wireless communication system and the state of a channel transmitting the equalized signal of frequency domain diversity.

In order to describe the method for transmitting a signal in a wireless communication system according to the embodiment of the present invention in more detail, reference is made to FIG. 2 in the following.

Figure 2:
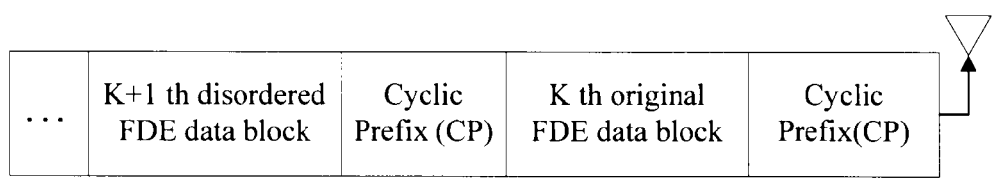
FIG. 2 is diagram illustrating retransmission of a disordered data block at a transmitting terminal in the TFI-FD-LE technology according to the embodiment of the invention.

FIG. 2 is diagram illustrating retransmission of a disordered data block at a transmitting terminal in the TFI-FD-LE technology according to the embodiment of the invention.

The TFI-FD-LE technology employs the same block transmission as that in the Frequency Domain Equalizer (FDE) to deal with the frequency selective channel, thereby transferring linear convolution to circular convolution. The length of a Cyclic Prefix (CP) is N, which is longer than the length of channel time delay propagation. The CP copies and cascades the rear part of each data block to the front part of another data block. Then, through removal of the CP, multipath interference across data blocks is eliminated at the receiving terminal. In view of the possibility of interleaving in the frequency domain, the following transmission block structure with time-frequency interleaving is designed at the transmitting terminal. In the time domain, each data block in the TFI-FD-LE technology is transmitted twice. The data order in the first data block is the same as that in the original data block. The data order in the second data block is obtained by disordering the original data block, as shown in FIG. 2. It is assumed that the m th symbol in the k th transmission block is $s^k(m)$. At time k=0, 2, 4, . . . , each pair of $s^k(m)$ and $s^{k+1}(m)$ with length of M is created through the same original data block. The arrangement is defined as follows.

$$s^{k+1}(m)=s^k(l_{random}^1) \text{ for } m=0, 1, \ldots, M-1$$

$l_{random}^1$ random above denotes a number of random disordering, $s^k(m)$ herein means the original data block without data order disordered, and $s^{k+1}(m)$ means a data block with data order being obtained by disordering the data order of $s^k(m)$. Moreover, $l_{random}^1$ should ensure that the number of the data symbol would not be repetitive. Through the operation of the interleaving, the frequency domain zero points of the frequency selective channel can be compensated while the corresponding FDE equalization is made. Thus, great increasing of noise energy at those zero points may be avoided.

The method above can be analogized to be applied to more data blocks with data order rearranged, to improve frequency domain diversity gain. If a same data block is transmitted three times, the data blocks transmitted the first and second times are the same as defined above, and the data block with data order disordered transmitted the third time is defined as $s^{k+2}(m)$. The arrangement of the data order of $s^{k+2}(m)$ is expressed as follows.

$$s^{k+2}(m)=s^k(l_{random}^2) \text{ for } m=0, 1, \ldots, M-1$$

$l_{random}^2$ random herein denotes a newly disordering number of $s^k(m)$. The method above can be analogized to be applied to $s^{k+3}(m)$, $s^{k+4}(m)$, etc. Meanwhile, the rearrangement of the data block above can be expressed by the following permutation matrix.

$$s^{k+1}=As^k$$

A herein is a M×M permutation matrix. The permutation matrix A is known in advance at the receiving terminal to facilitate signal equalization demodulation. Each time the data block is rearranged and transmitted, spectrum utilization would be reduced, resulting in the reduction of total data rate of the transmission system. However, the power for transmitting the signal is improved, and the diversity gain of sub-band frequency domain is increased. According to the requirement to the lowest transmission rate in the wireless communication system and the state of the channel, the times of the retransmitting of the data block can be adjusted, to achieve an optimal compromise between the signal transmission performance and the spectrum utilization.

The method for receiving a signal in a wireless communication system according to the embodiment of the invention is described in detail with reference to the drawings in the following.

Figure 3:
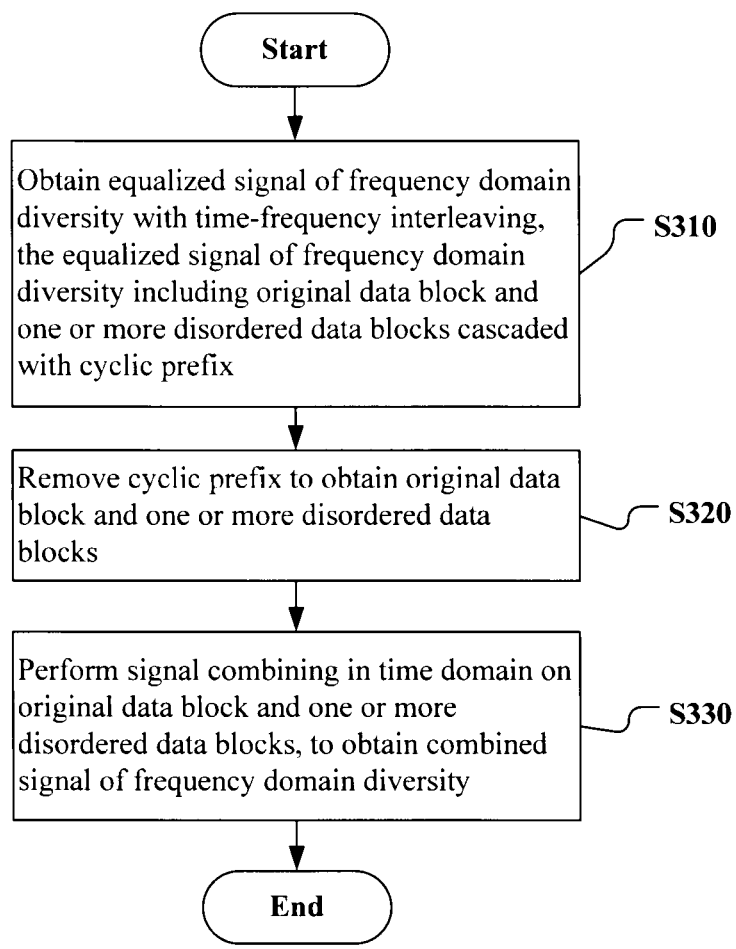
FIG. 3 is a flow chart illustrating a method for receiving a signal in a wireless communication system according to the embodiment of the invention.

FIG. 3 is a flow chart illustrating a method for receiving a signal in a wireless communication system according to the embodiment of the invention.

Firstly, in step S310, an equalized signal of frequency domain diversity with time-frequency interleaving is obtained, the equalized signal of frequency domain diversity including an original data block and one or more disordered data blocks cascaded with a cyclic prefix.

The equalized signal of frequency domain diversity with time-frequency interleaving obtained in step S310 may be an equalized signal of frequency domain diversity transmitted through the method for transmitting a signal in a wireless communication system according to the embodiment of the present invention as described above.

Next, in step S320, the cyclic prefix is removed to obtain the original data block and the one or more disordered data blocks.

Finally, in step S330, signal combining in time domain is performed on the original data block and the one or more disordered data blocks, to obtain a combined signal of frequency domain diversity.

According to the present invention, the TFI-FD-LE technology employs linear combining at the receiving terminal, to obtain frequency domain diversity gain. The linear combining is performed in the time domain, which is equivalent to combining in the frequency domain, thereby avoiding high complexity as in the frequency division system and the multi-antenna system due to the conventional combining of frequency domain diversity in the frequency domain. Accordingly, the system according to the present invention need not a multi-antenna, an OFDM frequency division system, or other complicated frequency division diversity such as diversity of hopping frequency.

According to the preferred embodiment of the present invention, the obtaining of the equalized signal of frequency domain diversity with time-frequency interleaving may be implemented by: receiving a wireless signal containing information on the equalized signal of frequency domain diversity through a radio frequency front end; and processing the wireless signal through an analog/digital converter and a digital filter, to obtain the equalized signal of frequency domain diversity.

According to the preferred embodiment of the present invention, the signal combining in time domain is maximum ratio combining.

According to the preferred embodiment of the present invention, the method for receiving the signal further includes the steps of: performing linear equalization on the combined signal of frequency domain diversity through a Minimum Mean Square Error algorithm; performing symbol decision or channel decoding on the linear equalized combined signal of frequency domain diversity, to obtain a resulting data block corresponding to the original data block; and outputting the resulting data block as a result for receiving the original data block.

Figure 4:
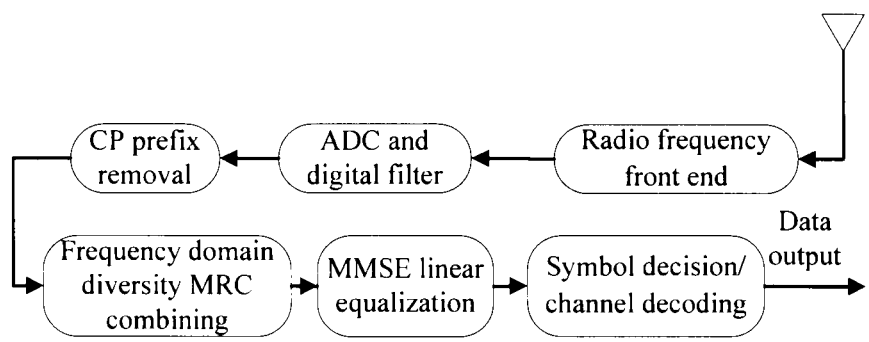
FIG. 4 is a diagram illustrating a demodulation algorithm performed at a receiving terminal in the TFI-FD-LE technology according to the embodiment of the invention.

The method for receiving a signal in a wireless communication system according the embodiment of the present invention can be better understood with reference to FIG. 4.

FIG. 4 is a diagram illustrating a demodulation algorithm performed at a receiving terminal in the TFI-FD-LE technology according to the embodiment of the invention.

At the receiving terminal, a receiving algorithm as shown in FIG. 4 is employed. Although it is signal combining in the time domain, it is equivalent to diversity combining in the frequency domain. With maximum ratio combining, an optimal diversity order can be obtained. Thus, attachments such as multi-RF, multi-ADC, and the like in the multi-antenna system are avoided at the receiving terminal, thereby reducing the complexity and energy consumption of the transmission system, and reducing the cost of the system.

In order to facilitate understanding of the present invention, an example of the demodulation algorithm performed at the receiving terminal is given below in which the times for retransmitting a data block are two. This is equivalent to a case in which the number of the diversity branches is two. When the times for retransmitting a disordered data block are more than two, the procedure of processing is the same as follows. Therefore, reference to the example in which the number of branches is two can be made as a general algorithm.

After ADC sampling and after a CP is removed in the time domain, at a transceiver with only one transmitting and receiving antenna in the TFI-FD-LE technology, data blocks k and k+1 at a receiving terminal can be considered as one vector and be expressed as follows.

$$y = \begin{bmatrix} y^{(k)} \\ y^{(k+1)} \end{bmatrix}$$
$$= H_0 s + n$$
$$= \begin{bmatrix} H_1 \\ H_2 \end{bmatrix} s + \begin{bmatrix} n_1 \\ n_2 \end{bmatrix}$$

Herein, $H_1$ is a M×M circular channel matrix, and $H_2 = H_1 A$, is a channel matrix with $H_1$ columns rearranged. $H_0$ is a 2M×M compound channel matrix including $H_1$ and $H_2$. And, it is assumed that a Channel Impulse Response (CIR) is statically constant per two successive data blocks. Based on matrix operations and assumptions above, the following formula is obtained.

$$H_0^H H_0 = [H_1^H H_2^H] \begin{bmatrix} H_1 \\ H_2 \end{bmatrix}$$
$$= [H_1^H H_1 + (H_1 A)^H H_1 A]$$

Herein, $(\cdot)^H$ denotes a complex transpose conjugate operation, $H_1^H H_1$ is also a circular matrix, on which eigenvalue decomposition can be performed. The result of the eigenvalue decomposition is denoted as $|\Lambda_1|^2$, i.e., the frequency domain response of the channel (herein, $\Lambda_1$ is a M×M diagonal matrix). According to permutation matrix property of A, $(H_1 A)^H H_1 A = A^H (H_1^H H_1) A$ herein is a matrix eigenvalue permutation matrix, which has a property that the eigenvalue $|\Lambda_2|^2$ thereof is disordering of the eigenvalue $|\Lambda_1|^2$. This means that the original deeply fading frequency domain sub channel is compensated by other irrelevant frequency domain sub channel. The ultimate result of eigenvalue decomposition of $H_0^H H_0$ is $|\Lambda_0(i,i)|^2 = |\Lambda_1(i,i)|^2 + |\Lambda_2(i,i)|^2$. That is, $|\Lambda_0|^2$ is a diagonal matrix, which is a frequency domain transform component of a set of compound channel impulse response. The diversity combining process herein is equivalent to a diversity combining of MRC in the frequency domain. Therefore, the TFI-FD-LE technology herein in which the number of the diversity branches is two obtains frequency diversity with two orders.

In summary, signal processing at the receiving terminal in the TFI-FD-LE technology is as follows. $\hat{s}$ outputted by MMSE equalization estimate can be expressed in the time domain as follows.

$$\hat{s} = \left(H_0^H H_0 + \frac{I_M}{SNR}\right)^{-1} H_0^H y$$
$$= \left(H_0^H H_0 + \frac{I_M}{SNR}\right)^{-1} H_0^H H_0 s$$

$I_M$ herein is a M×M unit diagonal matrix, and SNR is the signal noise ratio of the signal received by the receiver. As shown in FIG. 4, thereafter, symbol decision or channel decoding and soft decision can be performed on ŝ outputted by MMSE equalization estimate.

The device for transmitting a signal in a wireless communication system according to the embodiment of the invention is described in detail with reference to the drawings in the following.

Figure 5:
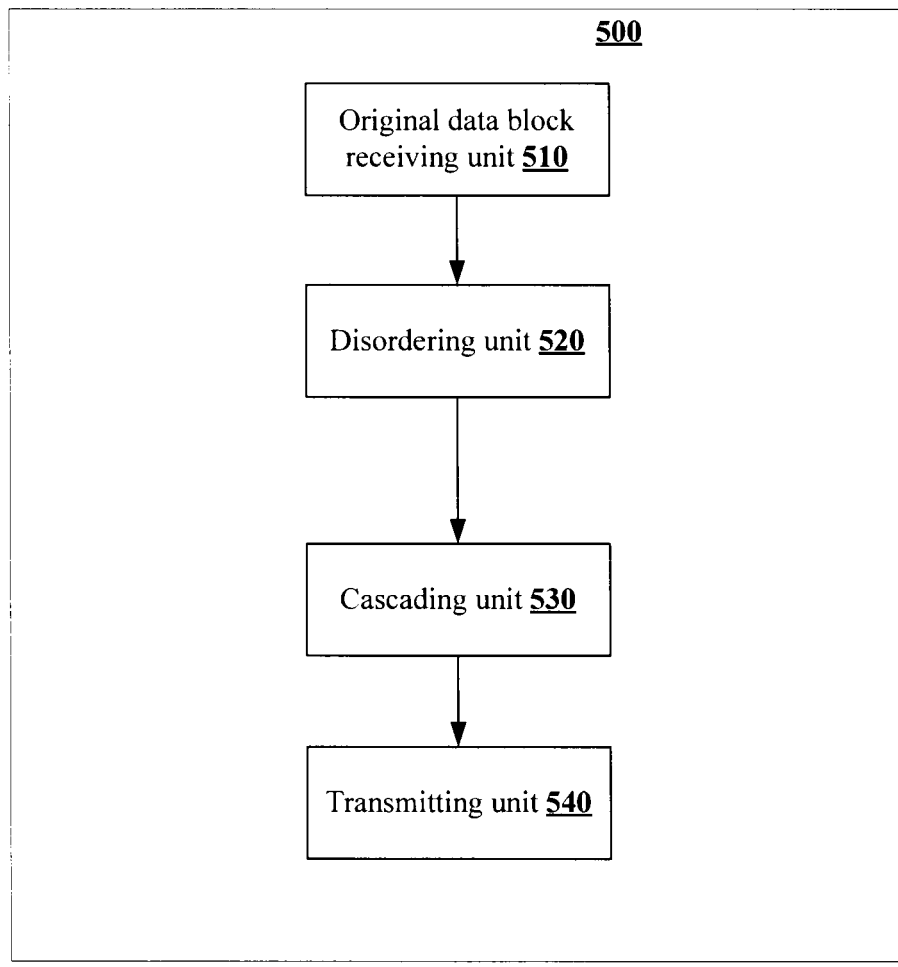
FIG. 5 is a block diagram illustrating a device for transmitting a signal in a wireless communication system according to the embodiment of the invention.

FIG. 5 is a block diagram illustrating a device 500 for transmitting a signal in a wireless communication system according to the embodiment of the invention.

As shown in FIG. 5, the device 500 according to the embodiment of the invention includes an original data block receiving unit 510, a disordering unit 520, a cascading unit 530, and a transmitting unit 540.

The original data block receiving unit 510 is adapted to receive an original data block to be transmitted, the length of the original data block being M, wherein M is an integer.

The disordering unit 520 is adapted to disorder the original data block received by the original data block receiving unit 510 for one or more times, whereby M data symbols in the original data block are rearranged in each of the one or more times of the disordering, so as to obtain one or more disordered data blocks with length of M.

The cascading unit 530 is adapted to cascade the original data block received by the original data block receiving unit 510 and the one or more disordered data blocks disordered by the disordering unit 520 with a cyclic prefix, to form an equalized signal of frequency domain diversity with time-frequency interleaving.

The transmitting unit 540 is adapted to transmit the equalized signal of frequency domain diversity formed by the cascading unit 530 through a single carrier.

According the embodiment of the present invention, the transmitting unit 540 transmits the equalized signal of frequency domain diversity formed by the cascading unit 530 over a quasi-static channel through the single carrier.

According the embodiment of the present invention, the disordering unit 520 determines the times of the disordering of the original data block based on the requirement to the lowest transmission rate in the wireless communication system and the state of a channel transmitting the equalized signal of frequency domain diversity.

The various specific implementations of the respective units above in the device 500 have been described in detail previously, and therefore the explanations thereof will not be repeated herein.

The device for receiving a signal in a wireless communication system according to the embodiment of the invention is described in detail with reference to the drawings in the following.

Figure 6:
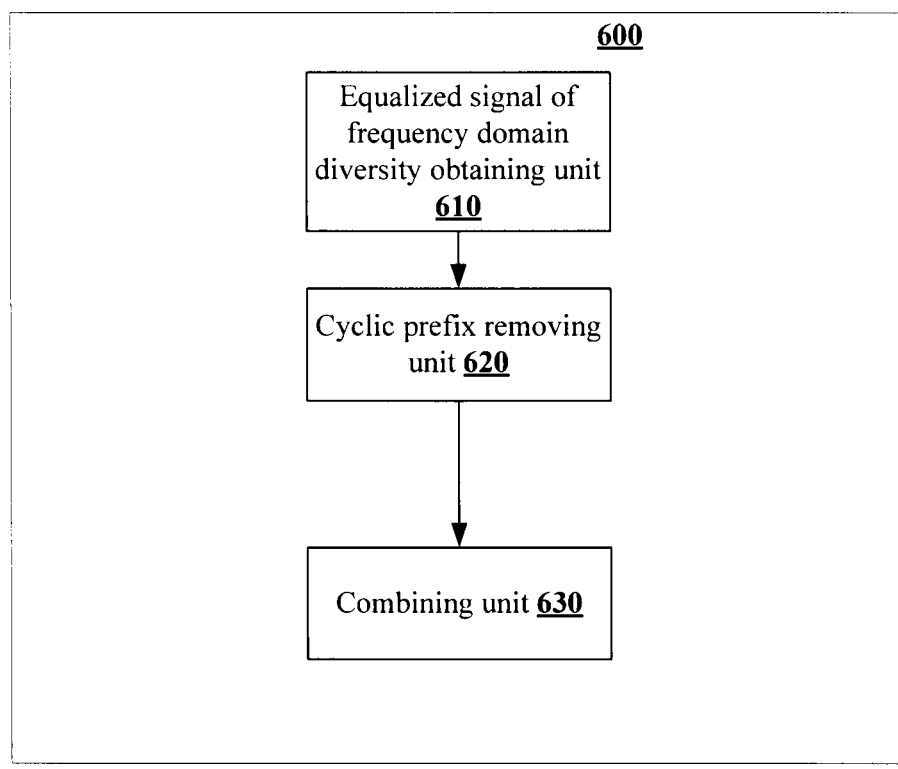
FIG. 6 is a block diagram illustrating a device for receiving a signal in a wireless communication system according to the embodiment of the invention.

FIG. 6 is a block diagram illustrating a device 600 for receiving a signal in a wireless communication system according to the embodiment of the invention.

As shown in FIG. 6, the device 600 according to the embodiment of the invention includes an equalized signal of frequency domain diversity obtaining unit 610, a cyclic prefix removing unit 620, and a combining unit 630.

The equalized signal of frequency domain diversity obtaining unit 610 is adapted to obtain an equalized signal of frequency domain diversity with time-frequency interleaving, the equalized signal of frequency domain diversity including an original data block and one or more disordered data blocks cascaded with a cyclic prefix.

The cyclic prefix removing unit 620 is adapted to remove the cyclic prefix to obtain the original data block and the one or more disordered data blocks.

The combining unit 630 is adapted to perform signal combining in time domain on the original data block and the one or more disordered data blocks obtained by the cyclic prefix removing unit 620, to obtain a combined signal of frequency domain diversity.

According to the embodiment of the present invention, the equalized signal of frequency domain diversity obtaining unit 610 may include: a radio frequency front end (not shown) configured to receive a wireless signal containing information on the equalized signal of frequency domain diversity; and an analog/digital converter and a digital filter (not shown) configured to process the wireless signal received by the radio frequency front end, to obtain the equalized signal of frequency domain diversity.

According to the embodiment of the present invention, the signal combining in time domain performed by the combining unit 630 is maximum ratio combining.

According to the embodiment of the present invention, the device 600 may further includes: an equalizing unit (not shown) configured to perform linear equalization on the combined signal of frequency domain diversity obtained by the combining unit 630 through a Minimum Mean Square Error algorithm; a symbol decision/channel decoding unit (not shown) configured to perform symbol decision or channel decoding on the combined signal of frequency domain diversity linear-equalized by the equalizing unit, to obtain a resulting data block corresponding to the original data block; and an outputting unit (not shown) configured to output the resulting data block obtained by the symbol decision/channel decoding unit as a result for receiving the original data block.

The various specific implementations of the respective units above in the device 600 have been described in detail previously, and therefore the explanations thereof will not be repeated herein.

In the device and method of the invention, it is obvious that respective components or steps can be decomposed and/or recombined. Such decomposition and/or recombination should be considered as an equivalent solution of the invention. And, the steps performing a series of processing above can be performed in the describing order naturally, but this is not necessary. Some steps can be performed concurrently or independently with one another.

Although the embodiment of the invention has been described in detail in combination with the drawings above, it should be understood that, the embodiment described above is only used to explain the invention and is not constructed as the limitation to the invention. For those skilled in the art, various modification and alternation can be made to the above embodiment without departing from the essential and scope of the invention. Therefore, the scope of the invention is only defined by the appended claims and the equivalents thereof.

The invention claimed is:
1. A method for transmitting a signal in a wireless communication system, comprising:
receiving an original data block to be transmitted, the length of the original data block being M, wherein M is an integer;

disordering the original data block for one or more times, whereby M data symbols in the original data block are rearranged in each of the one or more times of the disordering, so as to obtain one or more disordered data blocks with length of M;

cascading the original data block and the one or more disordered data blocks with a cyclic prefix, to form an equalized signal of frequency domain diversity with time-frequency interleaving; and transmitting the equalized signal of frequency domain diversity through a single carrier, wherein times of the disordering of the original data block is determined based on a requirement to a lowest transmission rate in the wireless communication system and a state of a channel transmitting the equalized signal of frequency domain diversity.

2. The method according to claim 1, wherein the equalized signal of frequency domain diversity is transmitted over a quasi-static channel through the single carrier.

3. A method for receiving a signal in a wireless communication system, comprising:

obtaining an equalized signal of frequency domain diversity with time-frequency interleaving, the equalized signal of frequency domain diversity including an original data block and one or more disordered data blocks cascaded with a cyclic prefix;

removing the cyclic prefix to obtain the original data block and the one or more disordered data blocks; and performing signal combining in time domain on the original data block and the one or more disordered data blocks, to obtain a combined signal of frequency domain diversity.

4. The method according to claim 3, wherein the obtaining of the equalized signal of frequency domain diversity with time-frequency interleaving is implemented by:

receiving a wireless signal containing information on the equalized signal of frequency domain diversity through a radio frequency front end; and processing the wireless signal through an analog/digital converter and a digital filter, to obtain the equalized signal of frequency domain diversity.

5. The method according to claim 3, wherein the signal combining in time domain is maximum ratio combining.

6. The method according to claim 3, further comprising:

performing linear equalization on the combined signal of frequency domain diversity through a Minimum Mean Square Error algorithm;

performing symbol decision or channel decoding on the linear equalized combined signal of frequency domain diversity, to obtain a resulting data block corresponding to the original data block; and outputting the resulting data block as a result for receiving the original data block.

7. A device for transmitting a signal in a wireless communication system, comprising:

an original data block receiving unit configured to receive an original data block to be transmitted, the length of the original data block being M, wherein M is an integer;

a disordering unit configured to disorder the original data block received by the original data block receiving unit for one or more times, whereby M data symbols in the original data block are rearranged in each of the one or more times of the disordering, so as to obtain one or more disordered data blocks with length of M;

a cascading unit configured to cascade the original data block received by the original data block receiving unit and the one or more disordered data blocks disordered by the disordering unit with a cyclic prefix, to form an equalized signal of frequency domain diversity with time-frequency interleaving; and a transmitting unit configured to transmit the equalized signal of frequency domain diversity formed by the cascading unit through a single carrier wherein the disordering unit is configured to determine times of the disordering of the original data block based on a requirement to a lowest transmission rate in the wireless communication system and a state of a channel transmitting the equalized signal of frequency domain diversity.

8. The device according to claim 7, wherein the transmitting unit is configured to transmit the equalized signal of frequency domain diversity formed by the cascading unit over a quasi-static channel through the single carrier.

9. A device for receiving a signal in a wireless communication system, comprising:

an equalized signal of frequency domain diversity obtaining unit configured to obtain an equalized signal of frequency domain diversity with time-frequency interleaving, the equalized signal of frequency domain diversity including an original data block and one or more disordered data blocks cascaded with a cyclic prefix;

a cyclic prefix removing unit configured to remove the cyclic prefix to obtain the original data block and the one or more disordered data blocks; and a combining unit configured to perform signal combining in time domain on the original data block and the one or more disordered data blocks obtained by the cyclic prefix removing unit, to obtain a combined signal of frequency domain diversity.

10. The device according to claim 9, wherein the equalized signal of frequency domain diversity obtaining unit includes:

a radio frequency front end configured to receive a wireless signal containing information on the equalized signal of frequency domain diversity; and an analog/digital converter and a digital filter configured to process the wireless signal received by the radio frequency front end, to obtain the equalized signal of frequency domain diversity.

11. The device according to claim 9, wherein the signal combining in time domain performed by the combining unit is maximum ratio combining.

12. The device according to claim 9, further comprising:

an equalizing unit configured to perform linear equalization on the combined signal of frequency domain diversity obtained by the combining unit through a Minimum Mean Square Error algorithm;

a symbol decision/channel decoding unit configured to perform symbol decision or channel decoding on the combined signal of frequency domain diversity linear-equalized by the equalizing unit, to obtain a resulting data block corresponding to the original data block; and an outputting unit configured to output the resulting data block obtained by the symbol decision/channel decoding unit as a result for receiving the original data block.

* * * * *